United States Patent
Esposito

(10) Patent No.: US 9,213,727 B1
(45) Date of Patent: Dec. 15, 2015

(54) METHODS AND APPARATUS FOR OBTAINING DATABASE PERFORMANCE SNAPSHOTS

(71) Applicant: EMC Corporation, Hopkinton, MA (US)

(72) Inventor: Jeffrey Daniel Esposito, North Kingstown, RI (US)

(73) Assignee: EMC Corporation, Hopkinton, MA (US)

( * ) Notice: Subject to any disclaimer, the term of this patent is extended or adjusted under 35 U.S.C. 154(b) by 445 days.

(21) Appl. No.: 13/630,242

(22) Filed: Sep. 28, 2012

(51) Int. Cl.
*G06F 17/30* (2006.01)

(52) U.S. Cl.
CPC .................. *G06F 17/30306* (2013.01)

(58) Field of Classification Search
None
See application file for complete search history.

(56) References Cited

U.S. PATENT DOCUMENTS

| | | | | |
|---|---|---|---|---|
| 5,021,997 | A * | 6/1991 | Archie et al. | 714/31 |
| 6,304,904 | B1 * | 10/2001 | Sathyanarayan et al. | 709/224 |
| 8,332,511 | B1 * | 12/2012 | Banerjee et al. | 709/224 |
| 8,479,202 | B2 * | 7/2013 | Hogan | G06F 9/485 718/100 |
| 9,003,010 | B1 * | 4/2015 | Saparoff | G06F 21/552 370/224 |
| 2006/0248101 | A1 * | 11/2006 | Griep | 707/101 |
| 2007/0088706 | A1 * | 4/2007 | Goff | 707/10 |
| 2008/0270340 | A1 * | 10/2008 | Abrams et al. | 707/1 |
| 2010/0124165 | A1 * | 5/2010 | Yang et al. | 370/217 |
| 2010/0229096 | A1 * | 9/2010 | Maiocco et al. | 715/734 |
| 2011/0178972 | A1 * | 7/2011 | Navarro et al. | 706/47 |
| 2012/0072480 | A1 * | 3/2012 | Hays et al. | 709/202 |
| 2013/0097305 | A1 * | 4/2013 | Albal | 709/224 |
| 2013/0139130 | A1 * | 5/2013 | Anjan et al. | 717/131 |
| 2014/0222745 | A1 * | 8/2014 | Deng et al. | 706/47 |

* cited by examiner

*Primary Examiner* — Richard Bowen
(74) *Attorney, Agent, or Firm* — Ryan, Mason & Lewis, LLP

(57) ABSTRACT

Methods and apparatus are provided for obtaining database performance snapshots. Performance data for one or more databases on a host is obtained by obtaining a host burden rating based on one or more of processing, network and input/out statistics of the host; determining a spawn limit based on the host burden rating; and spawning one or more scripts within the spawn limit, wherein each of the scripts collect performance data for a given database and is selected based on a database type of the given database. The host burden rating is a quantitative measure based on a sum of the processing, network and input/out statistics of the host. The collected performance data can be presented to a user in a graphical user interface and/or stored in a repository. The presented collected performance data for a given database comprises, for example, a score and/or a health assessment indicator based on predefined thresholds.

20 Claims, 6 Drawing Sheets

*FIG. 4*

Hire (Host aware Integrated Resource Evaluation) Agent 400

Context mediated/supplied with OS, DB Type, Account Information

Host Burden Estimator 410

1.0 Sample OS level CPU, Network, IO burden and set Spawn Limits
1.0.1 Get OS level CPU, Network, IO stats and pull for match against Limits parameters by OS
1.0.2 Set Host Burden rating integer based on actual metrics % of Limit (EX: CPU Limit of 75%, Warning @65%, Caution @50%)
Host Burden = addition of CPU, Network, IO ratings
1.0.3 Log and EXIT on either individual Limit or Host Burden > X

Workload Control 420

1.1 Set Spawn Limit pessimistically based on Host Burden
1.1.1 Spawn Limit assignment where X = Host Burden through switch/case $F(x) = x + 10$
... $(X > 60)$ {spawn = 2}...

Metered DB Snapshot Spawn 430

1.2 Assemble and Spawn DB Snapshot
1.2.1 Assemble Snapshot script based on DB Type
- Oracle, SQL, Server, DB2, postgres, etc.
- Embed account info (OS, LDAP, DB-specific)
1.2.2 Spawn DB Snapshot script within Spawn Limit

Process Thread Control 440

1.3 Log or destruct process threads based on Spawn ID
1.3.1 Trace Process Thread for Spawn
1.3.2 Destruct (kill) Spawn based on Spawn ID

FIG. 6

SQL SNAPSHOT QUEUE — 610

| CUSTOMER NAME | SITE | HOST | HOST DESCRIPTION | DATABASE NAME | DATABASE TYPE | VERSION | SAMPLE DATE | AVAILABLE | DB RATING |
|---|---|---|---|---|---|---|---|---|---|
| ABCDEFG | 123 | ABC123DEF | SUNFire | Alpha Production | Postgres | 10 | 9/8/2012 16:17 | ⊙ | |
| ABCDEFG | 123 | ABC123DEF | SUNFire | Alpha Production | Postgres | 10 | 9/8/2012 16:17 | ⊙ | |
| ABCDEFG | 123 | ABC123DEF | SUNFire | Alpha Production | Postgres | 10 | 9/8/2012 16:17 | ⊙ | |
| ABCDEFG | 123 | ABC123DEF | SUNFire | Alpha Production | Postgres | 10 | 9/8/2012 16:17 | ⊙ | |
| ABCDEFG | 123 | ABC123DEF | SUNFire | Alpha Production | Postgres | 10 | 9/8/2012 16:17 | | |
| ABCDEFG | 123 | ABC123DEF | SUNFire | Alpha Production | Postgres | 10 | 9/8/2012 16:17 | | |
| ABCDEFG | 123 | ABC123DEF | SUNFire | Alpha Production | Postgres | 10 | 9/8/2012 16:17 | | |
| ABCDEFG | 123 | ABC123DEF | SUNFire | Alpha Production | Postgres | 10 | 9/8/2012 16:17 | | |
| ABCDEFG | 123 | ABC123DEF | SUNFire | Alpha Production | Postgres | 10 | 9/8/2012 16:17 | | |
| ABCDEFG | 123 | ABC123DEF | SUNFire | Alpha Production | Postgres | 10 | 9/8/2012 16:17 | | |
| ABCDEFG | 123 | ABC123DEF | SUNFire | Alpha Production | Postgres | 10 | 9/8/2012 16:17 | | |
| ABCDEFG | 123 | ABC123DEF | SUNFire | Alpha Production | Postgres | 10 | 9/8/2012 16:17 | | |
| ABCDEFG | 123 | ABC123DEF | SUNFire | Alpha Production | Postgres | 10 | 9/8/2012 16:17 | | |

METHODS AND APPARATUS FOR OBTAINING DATABASE PERFORMANCE SNAPSHOTS

FIELD OF THE INVENTION

The present invention relates generally to techniques for database analysis.

BACKGROUND OF THE INVENTION

Enterprises make substantial investments in databases and associated storage for critical enterprise data. Database analysis is thus an important part of database management and performance. A number of tools have been proposed or suggested for analyzing database performance. EMC Grab™ from EMC Corporation, for example, is a utility (daemon) that is run locally on each host to gather and report storage-specific information. EMC Grab™ can be employed, for example, to obtain information about the databases on a given host and thereafter identify and correct performance issues.

Nonetheless, there is currently no mechanism for comprehensive scripted collection and interpretation of performance metrics for database applications, storage and hosts across a plurality of vendors. A need therefore remains for improved methods and apparatus for database analysis. A further need exists for vendor independent, non-obtrusive and comprehensive scripted collection and interpretation of performance metrics for database applications, storage and hosts.

SUMMARY OF THE INVENTION

The present invention in the illustrative embodiments described herein provides methods and apparatus for obtaining database performance snapshots. In accordance with an aspect of the invention, performance data for one or more databases on a host is obtained by obtaining a host burden rating based on one or more of processing, network and input/out statistics of the host; determining a spawn limit based on the host burden rating; and spawning one or more scripts within the spawn limit, wherein each of the scripts collect performance data for a given database and is selected based on a database type of the given database. The host burden rating is a quantitative measure based a sum of the processing, network and input/out statistics of the host.

The collected performance data can be presented to a user in a graphical user interface and/or stored in a repository. The presented collected performance data for a given database can be promoted or demoted within the graphical user interface. The presented collected performance data for a given database comprises, for example, a score and/or a health assessment indicator based on predefined thresholds. Another aspect of the invention wraps the collected performance data for a direct path to a staging area of the repository. The collected performance data is optionally scrubbed prior to storage in a repository.

The database performance data collection techniques of the illustrative embodiments overcome one or more of the problems associated with the conventional techniques described previously. These and other features and advantages of the present invention will become more readily apparent from the accompanying drawings and the following detailed description.

BRIEF DESCRIPTION OF THE DRAWINGS

FIG. 4 illustrates exemplary pseudo code for the HIRE agent employed by the processes of FIGS. 2 and 3;

FIG. 6 illustrates an exemplary database snapshot load queue.

DETAILED DESCRIPTION

Aspects of the present invention provide improved methods and apparatus for database analysis. Methods and apparatus are provided for vendor independent, non-obtrusive and comprehensive scripted collection and interpretation of performance metrics for database applications, storage and hosts. In this manner, the disclosed database analysis tool can provide a high level performance assessment as well as a comprehensive snapshot of database applications, storage and hosts.

Figure 1:
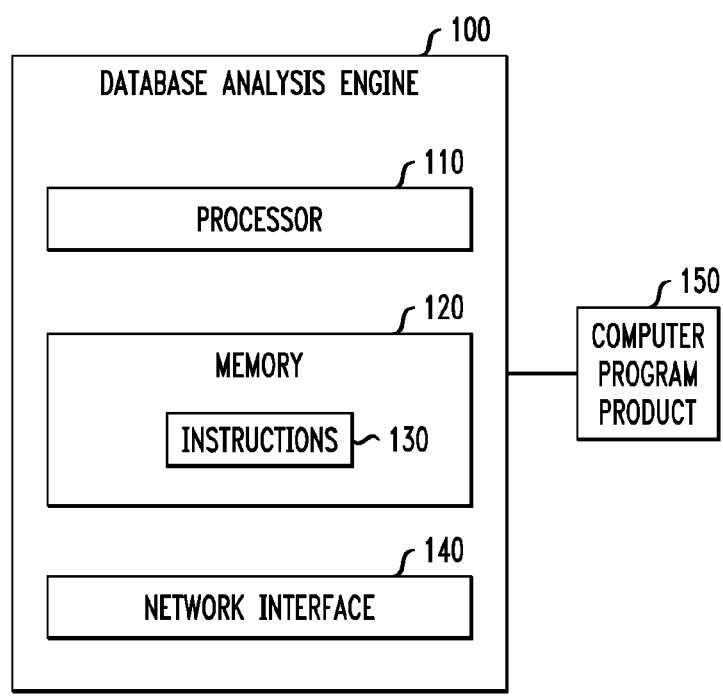
FIG. 1 is a schematic diagram illustrating an exemplary database analysis engine.

FIG. 1 is a schematic diagram illustrating an exemplary database analysis engine 100. The exemplary database analysis engine 100 includes a processor 110, a memory 120 and a network interface 140.

Memory 120 is configured to store data and code which includes instructions 130 to process the database layout process 200, as discussed further below in conjunction with FIG. 2. Memory 120 generally takes the form of, e.g., random access memory, flash memory or a non-volatile memory.

Processor 110 can take the form of, but is not limited to, an Intel™ or AMD™-based MPU, and can be a single or multi-core running single or multiple threads. Processor 110 is coupled to memory 120 and is configured to execute the instructions 130 stored in memory 120.

Network interface 140 is constructed and arranged to send and receive data over a communications medium. A computer program product 150 may optionally store additional instructions.

Figure 2:
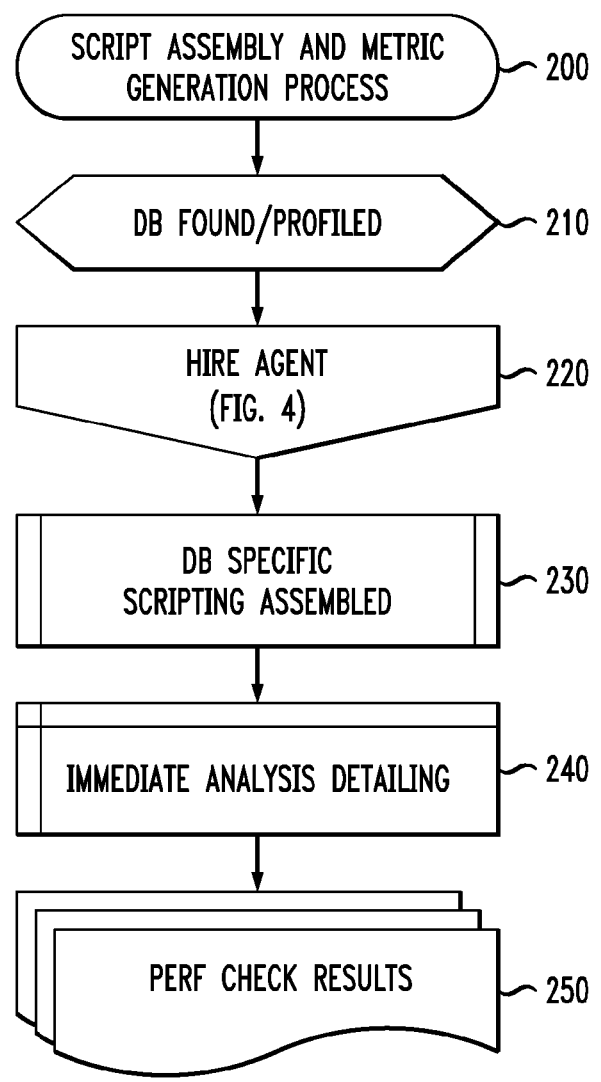
FIG. 2 is a flow chart describing an exemplary implementation of a script assembly and metric generation process incorporating aspects of the present invention.

FIG. 2 is a flow chart describing an exemplary implementation of a script assembly and metric generation process 200 incorporating aspects of the present invention. As shown in FIG. 2, the exemplary script assembly and metric generation process 200 initially determines whether a database is detected on the host where the script assembly and metric generation process 200 is installed during step 210. In this manner, a plurality of database vendors can be evaluated in the context of the host operating system. If a database is detected during step 210, a host-aware, integrated resource evaluation (HIRE) Agent 400, discussed further below in conjunction with FIG. 4, is executed during step 220. As discussed further below, the HIRE agent 400 assembles and spawns a correct number and type of database performance snapshot collection scripts 230 in the context of host resource activity to ensure non-intrusive and non-disruptive metrics collection. The multi-threaded scripts 230 are database specific scripts that collect the performance metric snapshots in real-time for database applications, storage and hosts. As discussed further below, one or more scripts 230 can be terminated if it interferes with the operation of the host.

In one exemplary embodiment, the script assembly and metric generation process 200 outputs immediate analysis detailing 240 and performance check results 250. Generally, these outputs are provided along with other host and storage metrics by an analysis tool, such as EMC Grab™.

Figure 3:
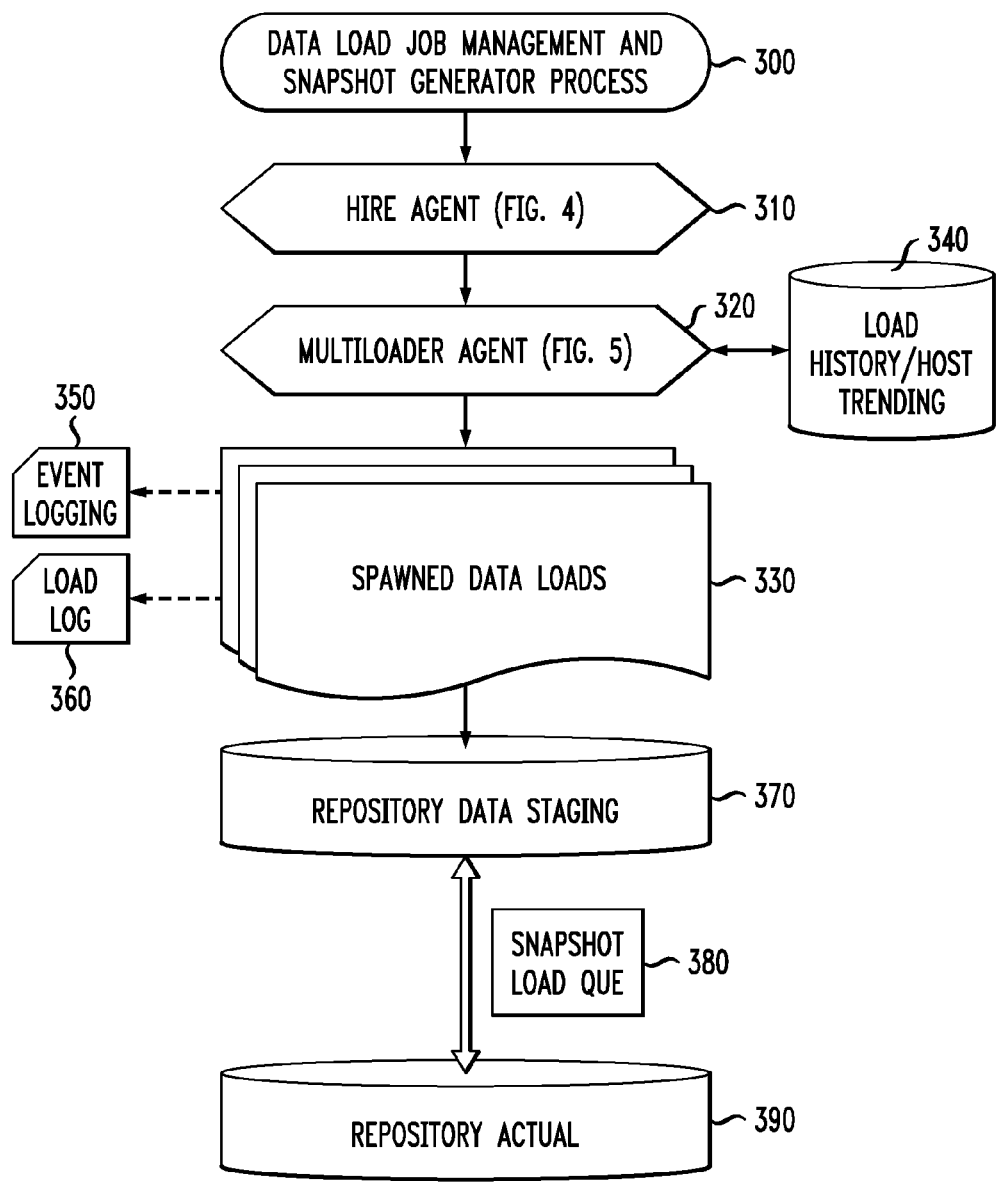
FIG. 3 is a flow chart describing an exemplary implementation of a data load job management and snapshot generator process incorporating aspects of the present invention.

FIG. 3 is a flow chart describing an exemplary implementation of a data load job management and snapshot generator process 300 incorporating aspects of the present invention. The exemplary data load job management and snapshot generator process 300 may be initiated by a database analysis tool, such as EMC Grab™. As shown in FIG. 3, the exemplary data load job management and snapshot generator process 300 executes the HIRE agent 400 during step 310, as discussed further below in conjunction with FIG. 4. As previously indicated, the HIRE agent 400 assembles and spawns a correct number and type of database performance snapshot collection scripts 230 in the context of host resource activity to ensure non-intrusive and non-disruptive metrics collection.

In addition, the exemplary data load job management and snapshot generator process 300 executes a multi-loader agent 500 during step 320, as discussed further below in conjunction with FIG. 5. Generally, the multi-loader agent 500 is responsible for non-invasive work queue management and logging.

As discussed further below, the HIRE agent 400 and multi-loader agent 500 interact to spawn, manage, log and deconstruct simultaneous data load jobs 330. As shown in FIG. 3, a load history/host trending data store 340 is accessed to help determine the correct number of spawns to ensure non-intrusive, non-disruptive processing.

As shown in FIG. 3, events are logged in an event log 350 and data loads are logged in a data log 360. In addition, the generated snapshots are stored in a repository 370 with a direct path load into DBClassify™ staging. In this manner, as discussed further below in conjunction with FIG. 6, promoted, "active" database snapshots are available throughout the DBClassify™ product in a snapshot load queue 380; while "staged" or demoted database snapshots are not, but can be promoted from the full or actual repository 390 using the retained data load log 360 and transparent data staging.

FIG. 4 illustrates exemplary pseudo code for the HIRE agent 400. Generally, the HIRE agent 400 assembles and spawns a correct number and type of database performance snapshot collection scripts 230 in the context of host resource activity to ensure non-intrusive and non-disruptive metrics collection.

As shown in FIG. 4, the HIRE agent 400 comprises a host burden estimator 410, a workload control block 420, a metered database snapshot spawn block 430 and a process thread control block 440. The exemplary host burden estimator 410 is a context mediated burden rating calculator that establishes a host burden rating based on comparing actual operating system metrics to predetermined limits. The host burden estimator 410 samples operating system-level CPU, Network, IO burden and sets a quantitative host burden rating. For example, the quantitative host burden rating can be a sum of CPU, Network and IO ratings.

The exemplary workload control block 420 comprises a spawn limit setter that is a switch/case evaluation based on a range of the quantitative host burden rating. For example, the spawn limit setter can set the spawn limit pessimistically based on the host burden rating.

The exemplary metered database snapshot spawn block 430 builds a snapshot script from a script library based on the database type (e.g., Oracle®, SQL Server®, DB2®, PostgreSQL®) and operating system. Database snapshot scripts are spawned within the established spawn limit.

The exemplary process thread control block 440 is a host resource safeguard (as opposed to a housekeeper). The exemplary process thread control block 440 logs or destructs process threads based on a spawn identifier.

Figure 5:
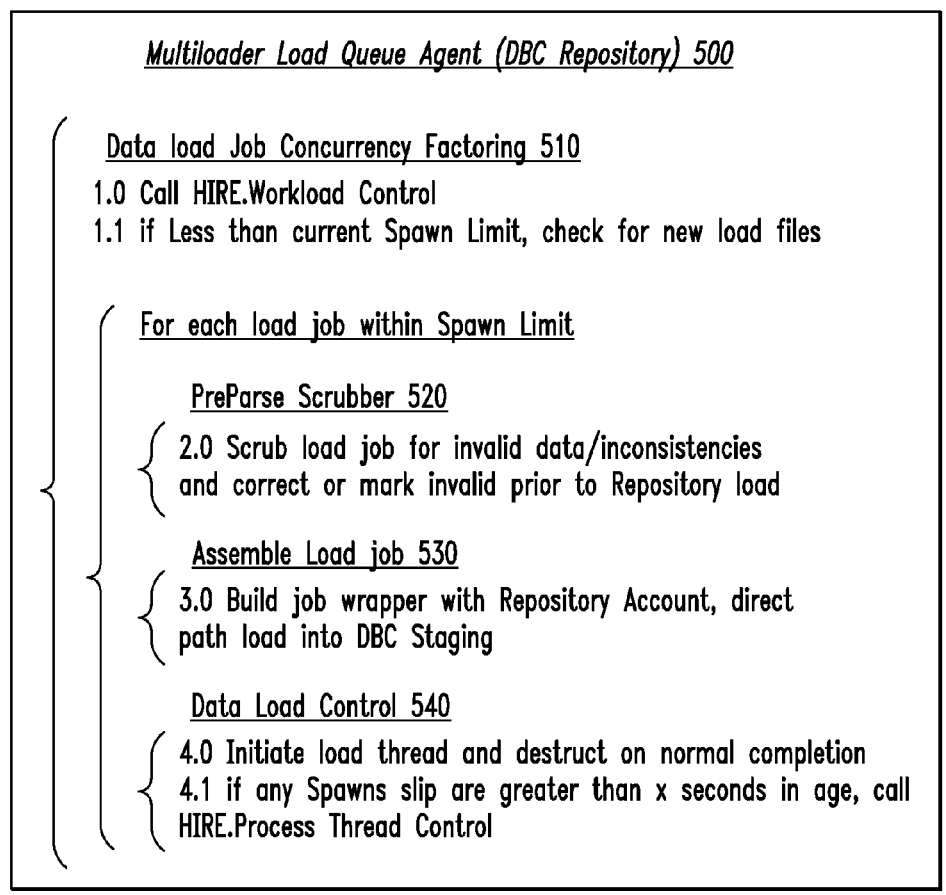
FIG. 5 illustrates exemplary pseudo code for the multi-loader agent employed by the process of FIG. 3.

FIG. 5 illustrates exemplary pseudo code for the multi-loader agent 500. Generally, the multi-loader agent 500 is responsible for non-invasive work queue management and logging. The exemplary multi-loader agent 500 comprises a data load job concurrency factoring block 510, a pre-parse scrubber 520, an assemble load job block 530 and a data load control block 540.

The exemplary data load job concurrency factoring block 510 checks for new data load files if the host is less than the current spawn limit. For each new job within the spawn limit, the exemplary data load job concurrency factoring block 510 calls the pre-parse scrubber 520, assemble load job block 530 and data load control block 540.

The exemplary pre-parse scrubber 520 protects the integrity of the repository 390 by culling out or correcting invalid data load, prior to a repository load event. The exemplary assemble load job block 530 wraps inbound data files for a direct path load into the staging area 370 of the repository 390. The exemplary data load control block 540 initiates loading of jobs and destructs jobs upon completion. A given script can be terminated if a predefined time threshold is exceeded.

FIG. 6 illustrates an exemplary database snapshot load queue 600. As indicate above, individual database snapshots within the load queue 600 can be promoted or demote. Active database snapshots can be available throughout the DBClassify™ product in the snapshot load queue 600; while "staged" or demoted database snapshots are not, but can be promoted from the full or actual repository 390 using the retained data load log 360 and transparent data staging.

As shown in FIG. 6, the exemplary database snapshot load queue 600 indicates the customer name for the database in field 610 and the host in field 620. A description of the host is provided in field 630. The database name, type and version are indicated in fields 640, 650 and 660, respectively. The date that the data statistics were collected is indicated in field 670. Finally, a rating for the database is indicated in field 680. The rating in field 680 may be, for example, a score or a health assessment, such as a Green/Yellow/Red indicator based on predefined thresholds.

As mentioned previously herein, the above-described embodiments of the invention are presented by way of illustrative example only. Numerous variations and other alternative embodiments may be used. For example, while the exemplary embodiment employs Oracle® databases, databases from other vendors can be designed. In addition, the exemplary graphical user interface (GUI) is for illustration purposes and any mechanism for a user to indicate desired selections can be employed.

The illustrative embodiments of the invention as described herein provide improved methods and systems for database analysis, It should again be emphasized that the particular embodiments described above are provided by way of illustration, and should not be construed as limiting the present invention to any specific embodiment or group of embodiments. For example, as previously noted, the described embodiments may be adapted in a straightforward manner to operate with other database vendors. Also, the particular configuration of system elements shown in FIG. 1, and their interactions as shown in FIGS. 2 through 5, may be varied in other embodiments. Moreover, the various simplifying assumptions made above in the course of describing the illustrative embodiments should also be viewed as exemplary rather than as requirements or limitations of the invention.

Numerous alternative embodiments within the scope of the appended claims will be readily apparent to those skilled in the art.

What is claimed is:

1. A method for obtaining performance data for one or more databases on a host, comprising:
   obtaining a host burden rating calculated from a comparison of one or more of processing, network and input/out statistics of said host to one or more predetermined limits;
   determining a spawn limit as a function of said host burden rating, wherein said spawn limit is a limit on a number of scripts that may be executed by said host substantially simultaneously; and
   spawning one or more scripts to execute on said host within said spawn limit, wherein each of said scripts executes on said host and collects performance data for a given database and is assembled and obtained from a script library based on a database type of said given database.

2. The method of claim 1, further comprising the step of storing said collected performance data in a repository.

3. The method of claim 1, further comprising the step of presenting said collected performance data to a user in a graphical user interface.

4. The method of claim 3, wherein said presented collected performance data for said given database can be promoted or demoted within said graphical user interface.

5. The method of claim 3, wherein said presented collected performance data for said given database comprises one or more of a score and a health assessment indicator based on predefined thresholds.

6. The method of claim 1, further comprising the step of wrapping said collected performance data for a direct path to a staging area of a repository.

7. The method of claim 1, wherein said host burden rating is a quantitative measure based on a sum of said processing, network and input/out statistics of said host.

8. The method of claim 1, further comprising the step of scrubbing said collected performance data prior to storage in a repository.

9. The method of claim 1, further comprising the step of terminating a given script if a predefined time threshold is exceeded.

10. The method of claim 1, wherein said assembling and obtaining of each of said scripts from a script library is further based on an operating system of said host.

11. A tangible machine-readable recordable storage medium for obtaining performance data for one or more databases on a host, wherein one or more software programs when executed by one or more processing devices implement the steps of the method of claim 1.

12. A system for obtaining performance data for one or more databases on a host, the apparatus comprising:
   a memory; and
   at least one hardware device, coupled to the memory, operative to implement the following steps:
   obtain a host burden rating calculated from a comparison of one or more of processing, network and input/out statistics of said host to one or more predetermined limits;
   determine a spawn limit as a function of said host burden rating, wherein said spawn limit is a limit on a number of scripts that may be executed by said host substantially simultaneously; and
   spawn one or more scripts to execute on said host within said spawn limit, wherein each of said scripts executes on said host and collects performance data for a given database and is assembled and obtained from a script library based on a database type of said given database.

13. The system of claim 12, wherein said at least one hardware device is further configured to store said collected performance data in a repository.

14. The system of claim 12, wherein said at least one hardware device is further configured to present said collected performance data to a user in a graphical user interface.

15. The system of claim 14, wherein said presented collected performance data for said given database can be promoted or demoted within said graphical user interface.

16. The system of claim 14, wherein said presented collected performance data for said given database comprises one or more of a score and a health assessment indicator based on predefined thresholds.

17. The system of claim 12, wherein said at least one hardware device is further configured to wrap said collected performance data for a direct path to a staging area of a repository.

18. The system of claim 12, wherein said host burden rating is a quantitative measure based on a sum of said processing, network and input/out statistics of said host.

19. The system of claim 12, wherein said at least one hardware device is further configured to scrub said collected performance data prior to storage in a repository.

20. The system of claim 12, wherein said at least one hardware device is further configured to terminate a given script if a predefined time threshold is exceeded.

* * * * *

UNITED STATES PATENT AND TRADEMARK OFFICE
CERTIFICATE OF CORRECTION

PATENT NO. : 9,213,727 B1  
APPLICATION NO. : 13/630242  
DATED : December 15, 2015  
INVENTOR(S) : Jeffrey Daniel Esposito It is certified that error appears in the above-identified patent and that said Letters Patent is hereby corrected as shown below:

IN THE SPECIFICATION

In column 1, line 43, replace "based a sum" with --based on a sum--.

In column 4, line 55, replace "analysis, It should" with --analysis. It should--.

Signed and Sealed this  
Twelfth Day of April, 2016

Michelle K. Lee  
*Director of the United States Patent and Trademark Office*